United States Patent
Kabasawa

(10) Patent No.: US 6,542,338 B1
(45) Date of Patent: Apr. 1, 2003

(54) DISK APPARATUS

(75) Inventor: Hidetoshi Kabasawa, Saitama-Ken (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/253,276

(22) Filed: Feb. 19, 1999

(30) Foreign Application Priority Data

Mar. 12, 1998 (JP) ............................................. 10-61611

(51) Int. Cl.⁷ .......................... G11B 17/32; G11B 21/20; G11B 21/24; G11B 5/56
(52) U.S. Cl. .................................. 360/294.7; 360/254.1
(58) Field of Search .......................... 360/99.01, 99.02, 360/99.03, 254.1, 255.4, 294.7

(56) References Cited

U.S. PATENT DOCUMENTS

| | | | |
|---|---|---|---|
| 4,400,750 A | * 8/1983 | Krane | 360/105 |
| 4,528,607 A | * 7/1985 | Thompson | 360/106 |
| 4,626,943 A | * 12/1986 | Janssen et al. | 360/99.03 |
| 4,901,176 A | * 2/1990 | Kuzuhara | 360/104 |
| 5,099,377 A | * 3/1992 | Shimizu | 360/130.34 |

FOREIGN PATENT DOCUMENTS

| | | | |
|---|---|---|---|
| DE | 3502161 | * | 8/1985 |
| JP | Sho 59-112463 | | 6/1984 |
| JP | 62-298066 | * | 6/1986 |
| JP | Sho 63-86150 | | 4/1988 |
| JP | Hei 1-94576 | | 4/1989 |
| JP | 1-286168 | * | 11/1989 |
| JP | 7-235025 | * | 9/1995 |
| JP | 7-282553 | | 10/1995 |
| JP | 2650629 | | 5/1997 |

* cited by examiner

Primary Examiner—William Klimowicz
(74) Attorney, Agent, or Firm—Anderson Kill & Olick; Eugene Lieberstein; Michael N. Meller

(57) ABSTRACT

A disk apparatus has a mechanism for adjusting a head load pressure exerted on a lower surface of a floppy disk by a lower magnetic head. The magnetic head load pressure adjustment mechanism is fixed to a carriage body, and includes a lower suspension and a head load pressure adjustment lever. The lower suspension has a head load spring portion, the spring force of which generates the load pressure exerted on the lower surface of the floppy disk by the lower magnetic head. Rotating the head load pressure adjustment lever changes the state of the deflection of the head load spring portion, thereby adjusting the head load pressure of the lower magnetic head.

9 Claims, 14 Drawing Sheets

DISK APPARATUS

BACKGROUND OF THE INVENTION

1. Field of the Invention

The present invention relates generally to a disk apparatus, and more particularly to a disk apparatus for writing data to and reading data from a rotating floppy disk by movement of a head carriage.

2. Description of the Related Art

Conventionally, floppy disk apparatuses are widely used in personal computers as external memory devices. In recent years, in an effort to cope with the coming video age, floppy disk apparatuses have begun to be developed that greatly expand memory capacity from the current 1.44 MB to 200 MB or more. In order to expand memory capacity to such a large extent, it is necessary to increase the current 300 rpm rotation speed of the floppy disk by 10 times or more and at the same time increase the current track density of 135 tracks per inch (hereinafter tpi) by 10 times or more, to 2,000 to 3,000 tpi.

In order to reliably write and read data under these high-speed, high-density conditions, the head load pressure of the magnetic head, that is, the pressure exerted by the magnetic head on the floppy disk, becomes an important consideration. Specifically, the ability to precisely adjust the head load pressure of the magnetic head exerted on the floppy disk becomes crucial to reliable writing and reading of data under such conditions.

However, the structure of the conventional floppy disk apparatus is not suitable for making such precise adjustments to the head load pressure. Typically, as shown in FIG. 14, the conventional floppy disk apparatus has a head carriage 11, the head carriage having a lower magnetic head 12 and an upper magnetic head 13. The head carriage further has a supporting frame 14 on the lower portion thereof, the frame being moved in an essentially planar longitudinal direction indicated by the double-headed arrow Y1←→Y2 in FIG. 14 so as to write data to or read data from a rotating floppy disk inserted in the head carriage between the lower magnetic head 12 and upper magnetic head 13. Additionally, the head carriage further has a carriage body 16, a spring plate 17 fixedly mounted on the carriage body 16 and a head arm 18 mounted on the front edge of the spring plate 17. The lower magnetic head 12 is mounted on the front edge of the carriage body 16 and the upper magnetic head 13 is mounted on the front edge of the head arm 18. A head load spring 19 applies head load pressure to the upper magnetic head 13.

However, although it is possible to adjust the head load pressure of the upper magnetic head 13 to an optimum value by changing the stop position of the head load spring 19 at the rear side, that is the Y1 side, it is not possible to adjust the head load pressure of the lower magnetic head 12 because there is no mechanism either for applying head load pressure to the lower magnetic head 12 or for adjusting the head load pressure of the lower magnetic head 12.

As a result, the head load pressure of the lower magnetic head exerted on the rotating floppy disk 15 is not uniformly optimal but differs with each assembled floppy disk apparatus 10, making uniformly reliable data writing and data reading difficult to obtain. Additionally, the lower magnetic head 12 does not track well floppy disks of high density rotating at high speeds.

SUMMARY OF THE INVENTION

Accordingly, it is an object of the present invention to provide a floppy disk apparatus in which the problems described above are eliminated.

The above-described object of the present invention is achieved by a floppy disk apparatus comprising:

disk rotating means for supportably rotating a floppy disk;

an upper magnetic head and a lower magnetic head for writing data to and reading data from an upper surface and a lower surface of a floppy disk being rotated by said disk rotating means; and a head carriage that moves in a direction of a radius of said rotating floppy disk, the head carriage comprising:

a carriage body for supporting said lower magnetic head at a front edge thereof;

a head arm supported by said carriage body for supporting said upper magnetic head at a front edge thereof; and a head load spring mounted on said head arm for applying head load pressure to said upper magnetic head to press on said upper surface of said floppy disk, wherein said lower magnetic head comprises means for adjusting a head load pressure of said lower magnetic head exerted on a lower surface of said floppy disk.

By adjusting the head load pressure of the lower magnetic head exerted on the lower surface of the floppy disk, it becomes possible to obtain uniform optimal head load pressure of the lower magnetic head exerted on the floppy disk, thus obtaining reliable data writing and data reading for all floppy disk apparatuses assembled.

Additionally, the above-described object of the present invention is also achieved by said means for adjusting said head load pressure of said lower magnetic head exerted on said lower surface of said floppy disk comprising:

a suspension for generating said load pressure exerted on said lower surface of said floppy disk, a base of said suspension being fixedly mounted on said carriage body and said lower magnetic head being mounted on a front edge of said suspension;

a head load spring portion that elastically deflects to change said head load pressure exerted on said lower magnetic head, said head load spring portion being formed on a part of said suspension; and an adjustment member movably mounted on said carriage body that operates for changing a state of a deflection of said head load spring portion.

The head load spring portion is formed on a part of the suspension, so changes in the state of the deflection of the head load spring portion result in small changes in the head load pressure of the lower magnetic head. As a result, it becomes possible to precisely adjust the head load pressure of the lower magnetic head so as to reliably write data to and read data from high-density floppy disks rotating at high speeds.

Further, the adjustment member is mounted on the carriage body so as to rotate through a horizontal plane, so the lower magnetic head load pressure adjustment mechanism is not bulky, making it possible to make the floppy disk apparatus slim.

Additionally, the above-described object of the present invention is also achieved by the disk apparatus as described above, wherein the means for adjusting the head load pressure of the lower magnetic head comprises:

a suspension for generating the load pressure exerted on the lower surface of the floppy disk, a base of the suspension being fixedly mounted on the carriage body and the lower magnetic head being mounted on a front edge of the suspension; and an adjustment member movably mounted on the carriage body so as to be capable of contacting the suspension, the adjustment member operating to adjust the head load pressure generated by the suspension.

Additionally, the above-described object of the present invention is also achieved by the disk apparatus as described above, wherein the adjustment member comprises a contacting portion that contacts the suspension and an operating portion for moving the adjustment member.

Additionally, the above-described object of the present invention is also achieved by the disk apparatus as described above, wherein the operating member of the adjustment member is provided on a surface of a side opposite a surface of a side of the carriage body on which the head arm is provided and a restraining member is provided on the carriage body so as to prevent deformation of the suspension beyond a predetermined point.

Other objects, features and advantages of the present invention will become more apparent from the following detailed description when read in conjunction with the accompanying drawings.

DESCRIPTION OF THE PREFERRED EMBODIMENTS

A detailed description will now be given of a first embodiment of a disk apparatus according to the present invention, with reference to FIG. 1 and FIG. 2(A), FIG. 2(B) and FIG. 2(C).

Figure 1:
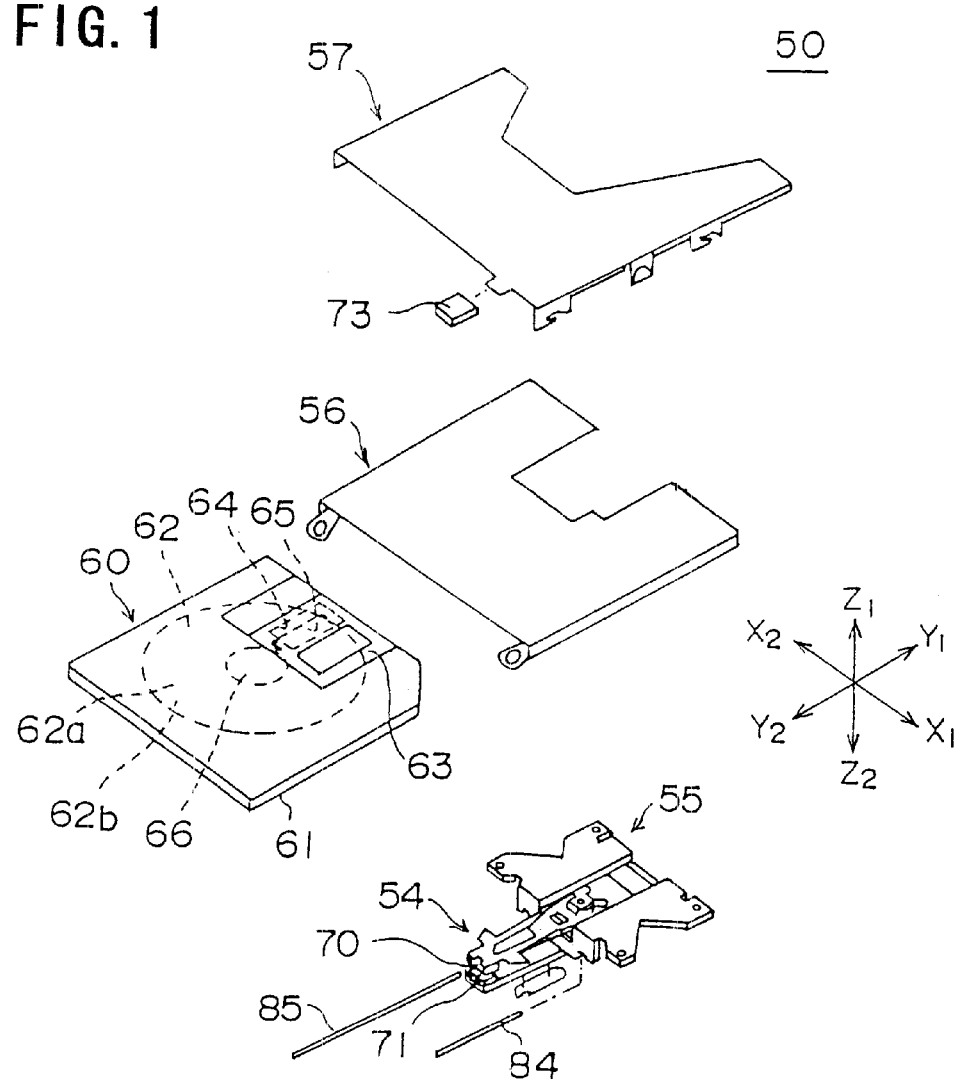
FIG. 1 is an exploded view of a first embodiment of a disk apparatus according to the present invention.
Figure 2A:
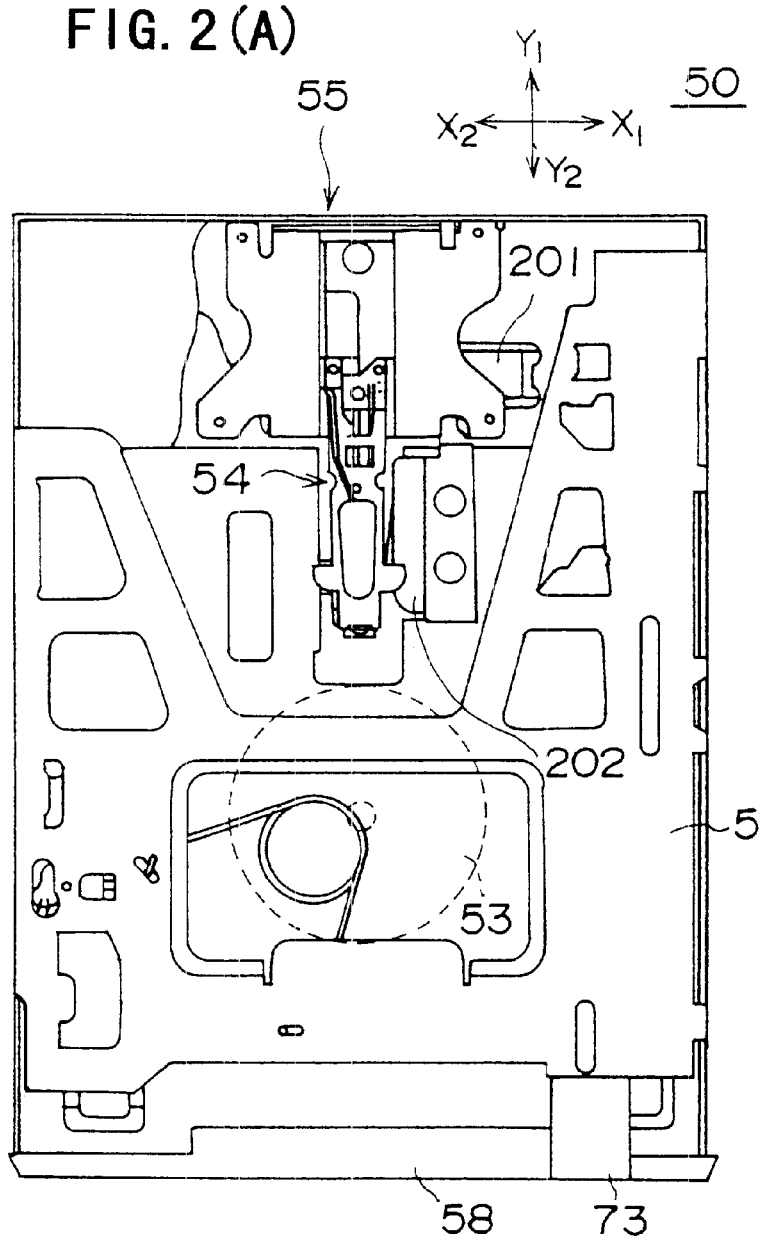
FIGS. 2(A), 2(B) and 2(C) are respectively diagrams showing a first embodiment of a disk apparatus according to the present invention.
Figure 2C:
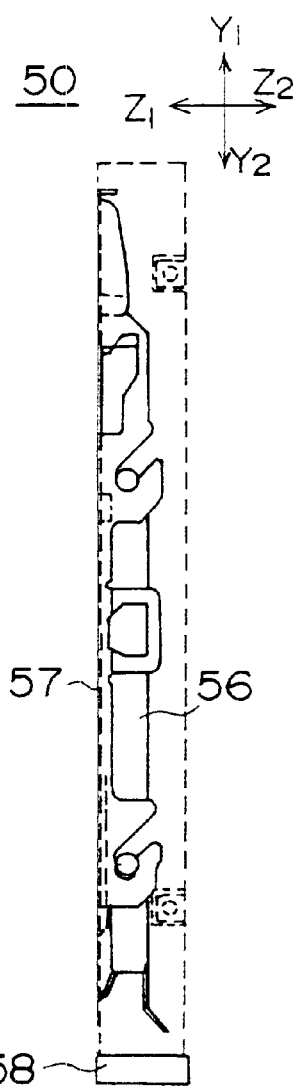
Figure 2B:
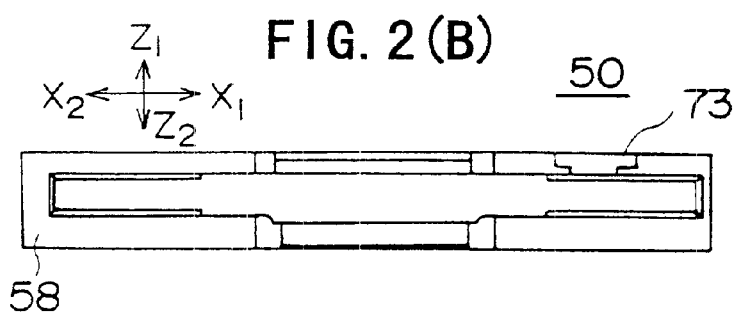
Figure 3:
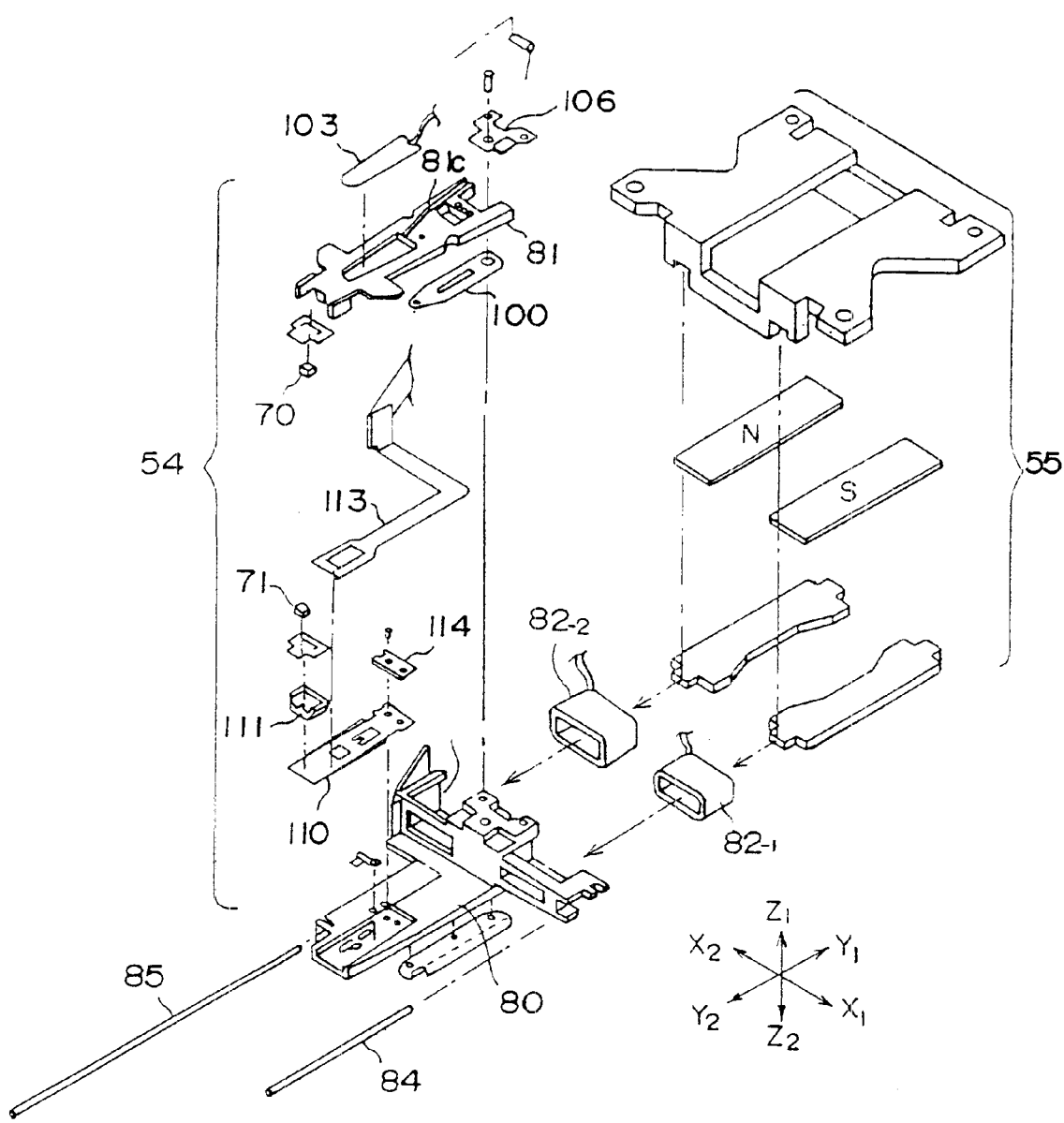
FIG. 3 is an exploded view of a head carriage and a voice coil motor portion of a disk apparatus according to the present invention.
Figure 4:
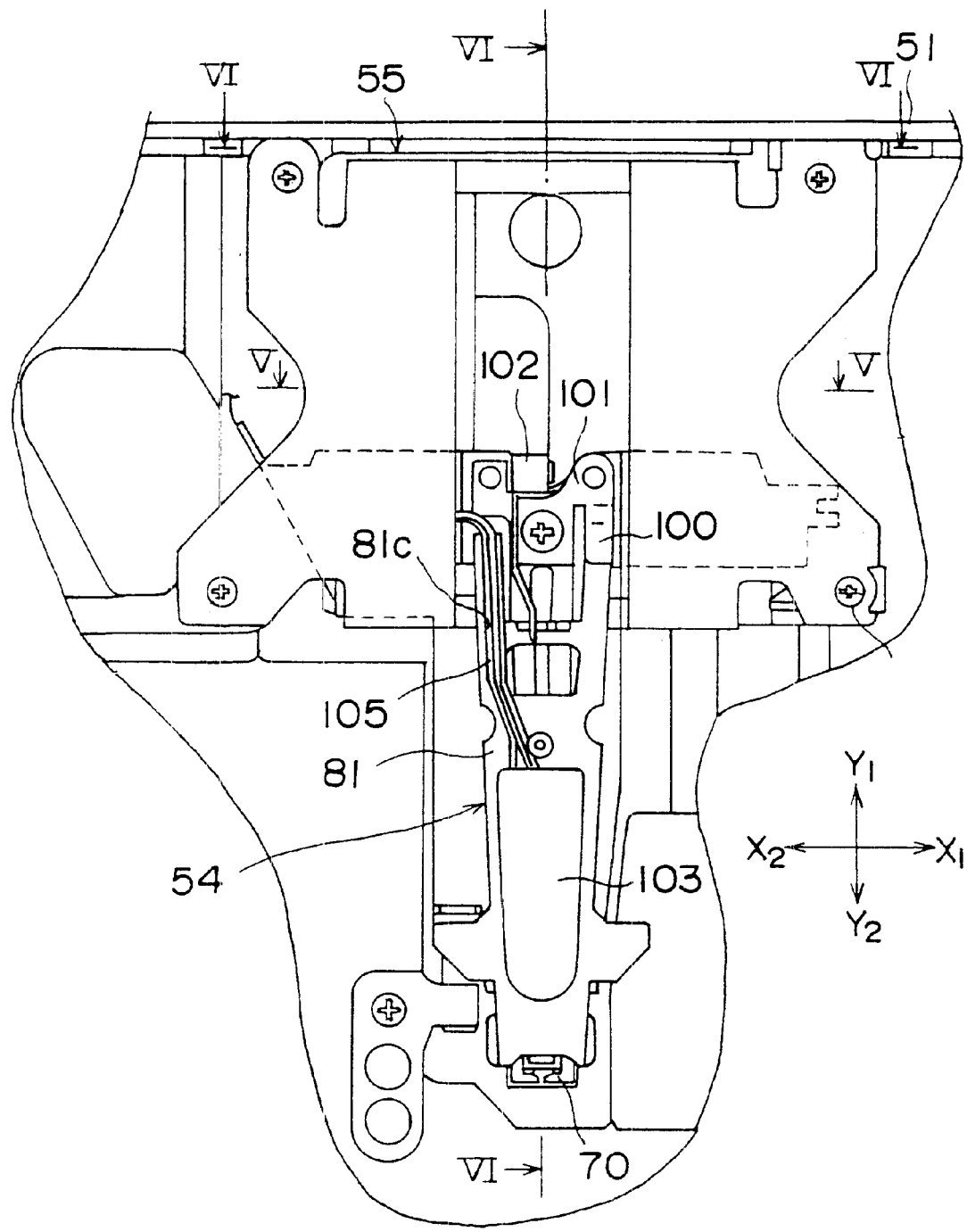
FIG. 4 is a top surface view of a head carriage and a voice coil motor portion of a disk apparatus according to the present invention.
Figure 5:
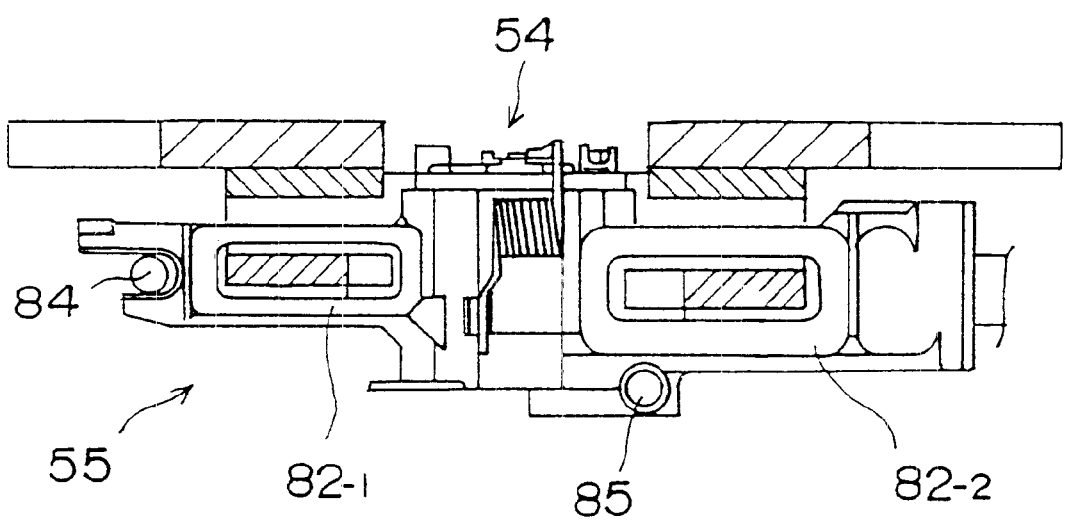
FIG. 5 is a cross-sectional view along the line V—V in FIG. 4.

FIG. 1 is an exploded view of a first embodiment of a disk apparatus according to the present invention. FIG. 2 is a diagram showing top, front and side views of said first embodiment of said disk apparatus. The floppy disk apparatus 50 has a frame 51, a turntable motor 52, a turntable 53, a head carriage 54, a voice coil motor 55, a holder 56, a slider 57 that also functions as a cover, and a front bezel 58. X1-X2 represents the horizontal dimension, Z1-Z2 represents the vertical dimension and Y1-Y2 represents the depth front-and-rear dimension.

A disk cartridge 60 is used with the floppy disk apparatus 50. A cartridge body 61 of the disk cartridge 60 contains internally a floppy disk 62 having a diameter of 3.5 inches. Further, a shutter 63 is provided on an edge of the cartridge body 61. The shutter 63 covers an upper opening 64 and a lower opening 65 in an upper and lower surface of the cartridge body 61, respectively. A hub 66 of the floppy disk 62 is exposed at the lower surface of the cartridge body 61.

When inserted from the front bezel 58 toward the rear, that is, in the Y1 direction, the disk cartridge 60 fits inside the holder 56, the shutter 62 slides in the horizontal X2 direction and the openings 64 and 65 are opened. The upper magnetic head 70 opposes an upper opening 64 and the lower magnetic head 71 opposes a lower opening 65. When a lock is released the slider 57 slides toward the front, that is, in the Y2 direction, lowering the holder 56 together with the disk cartridge 60 in the Z2 direction. The disk cartridge 60 is thus loaded into the floppy disk apparatus 50, the hub 66 of the floppy disk 62 is set upon the turntable 53 and the lower opening 65 is placed over the lower magnetic head 71 so as to bring the lower magnetic head 71 into contact with a lower surface 62b of the floppy disk 62. The floppy disk 62 is then rotated by the turntable motor 52 at a speed of approximately 3,600 rpm. Thereafter a head load mechanism (not shown) is activated by a solenoid 201 (see FIG. 2) being excited and a lift arm 202 is lowered. The upper magnetic head 70, which is supported by the lift arm, then descends into the upper opening 64 to contact an upper surface of the floppy disk 62.

The head carriage 54 is moved by the voice coil motor 55 in the Y1-Y2 direction and data is written to or read from the surface of the floppy disk, which has been formed into tracks of 2,000–3,000 tpi, by the upper magnetic head 70 and lower magnetic head 71. At this point, the upper magnetic head 70 and lower magnetic head 71 float slightly off the surface of the floppy disk due to the speed with which the floppy disk rotates.

By pressing the eject button 73 the disk cartridge 60 is ejected by moving first upward in the Z1 direction and then forward in the Y2 direction.

A detailed description will now be given of the head carriage 54, by reference to FIG. 3 through FIG. 7.

Figure 6:
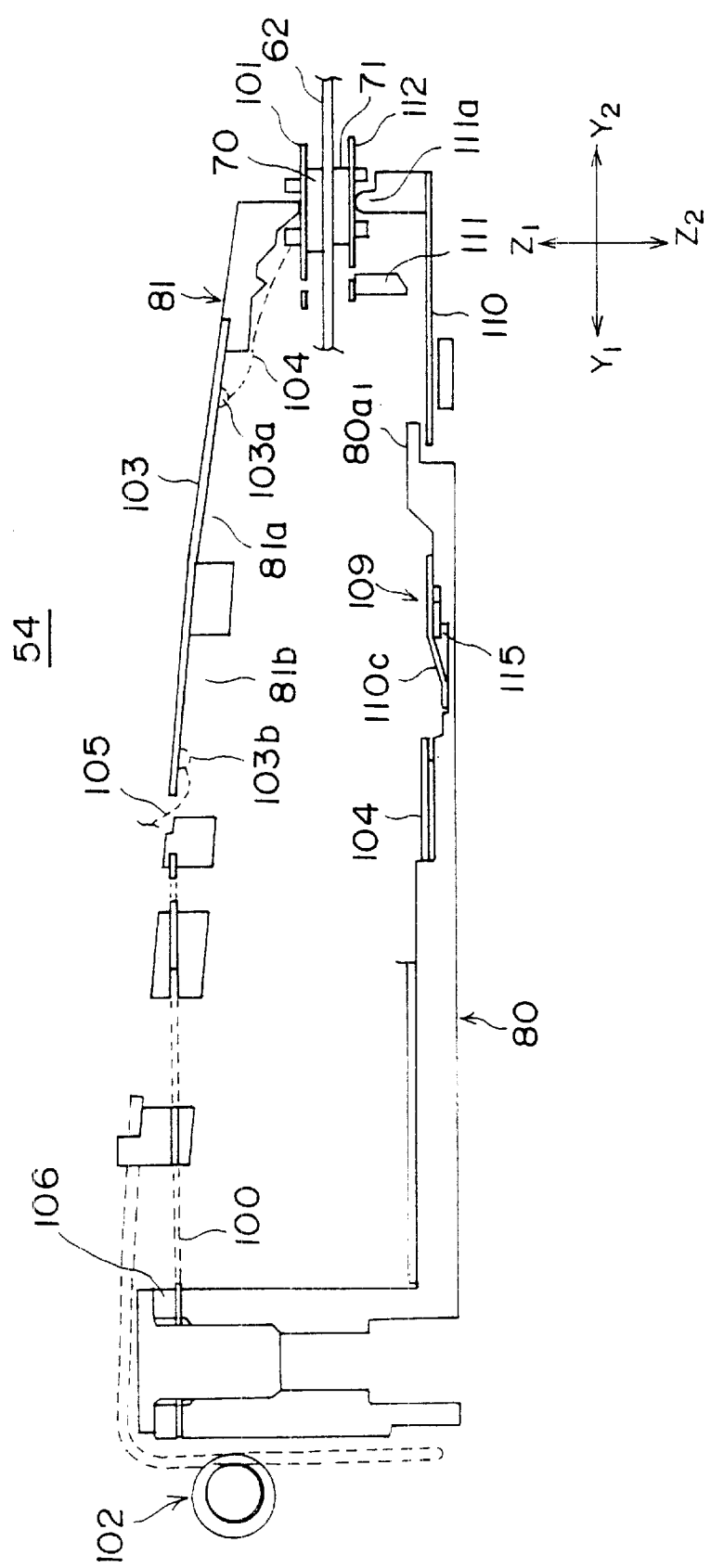
FIG. 6 is a cross-sectional view along the line VI—VI in FIG. 4.

As shown in FIG. 6, the head carriage 54 comprises an L-shaped carriage body 80, an upper head arm 81, a lower magnetic head 71 provided on a front edge of the carriage body 80 and an upper magnetic head 70 provided on a front edge of the upper head arm 81. Hollow drive coils 82-1 and 82-2 are fixedly mounted on X1 and X2 sides of the carriage body 80. The head carriage 54 is supported by parallel guide rods 84 and 85 affixed to the frame 51 so as to be movable in the Y1-Y2 direction.

Additionally, a plate 106 attaches a spring plate 100 to an upper surface of a vertically protruding portion at the rear Y1 edge of the carriage body 80. The upper head arm 81 is fixedly mounted at the front edge of the spring plate 100. A gimbal 101 fixedly mounted on a lower surface of a front edge of the upper head arm 81 supports the upper magnetic head 70. Further, a head load spring 102 comprising a helical torsion spring is provided. The spring force of the head load spring 102 pushes down on the upper head arm 81 via the spring plate 100, imparting head load pressure to the upper magnetic head 70.

Figure 7:
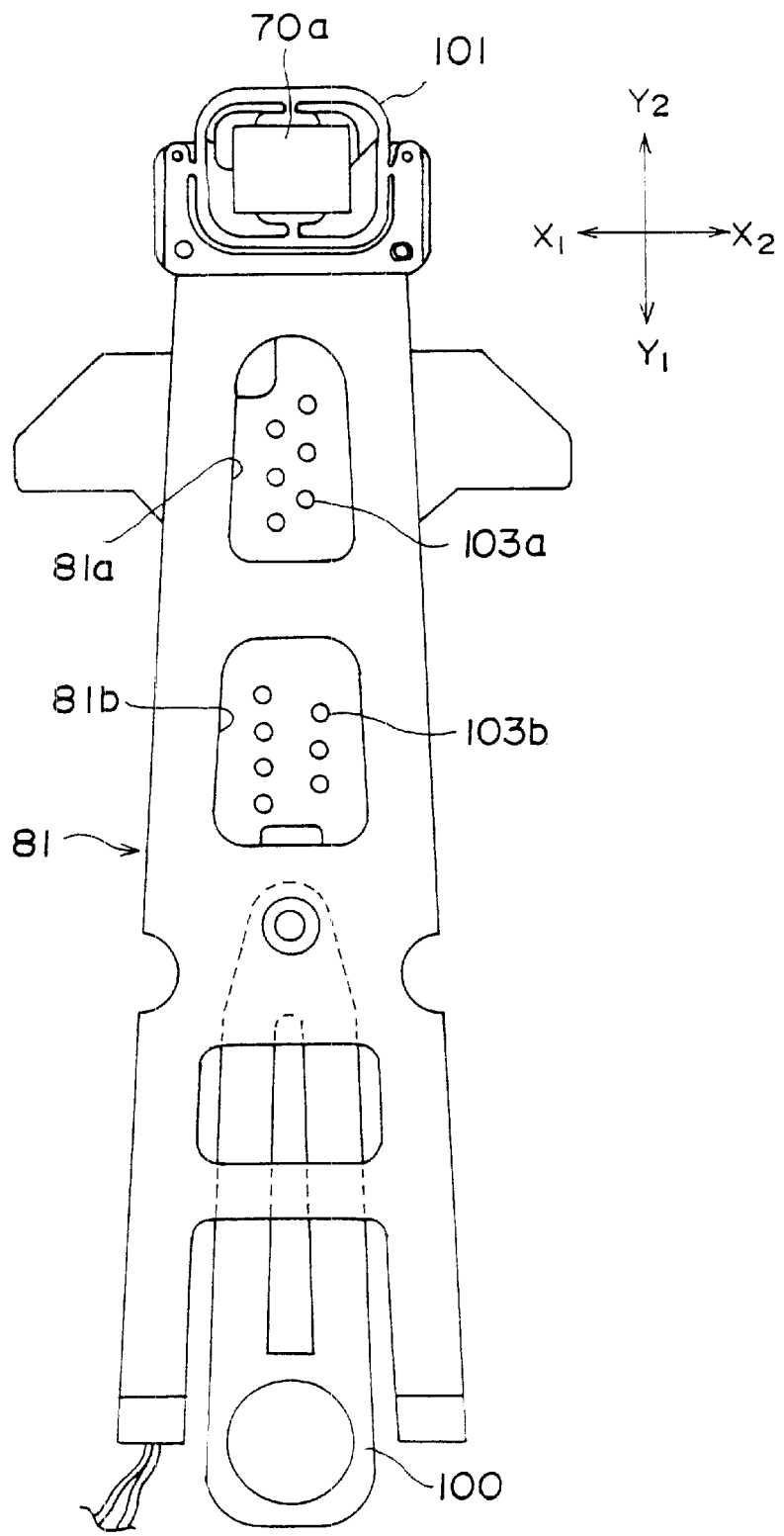
FIG. 7 is a bottom view of a head arm.
Figure 8:
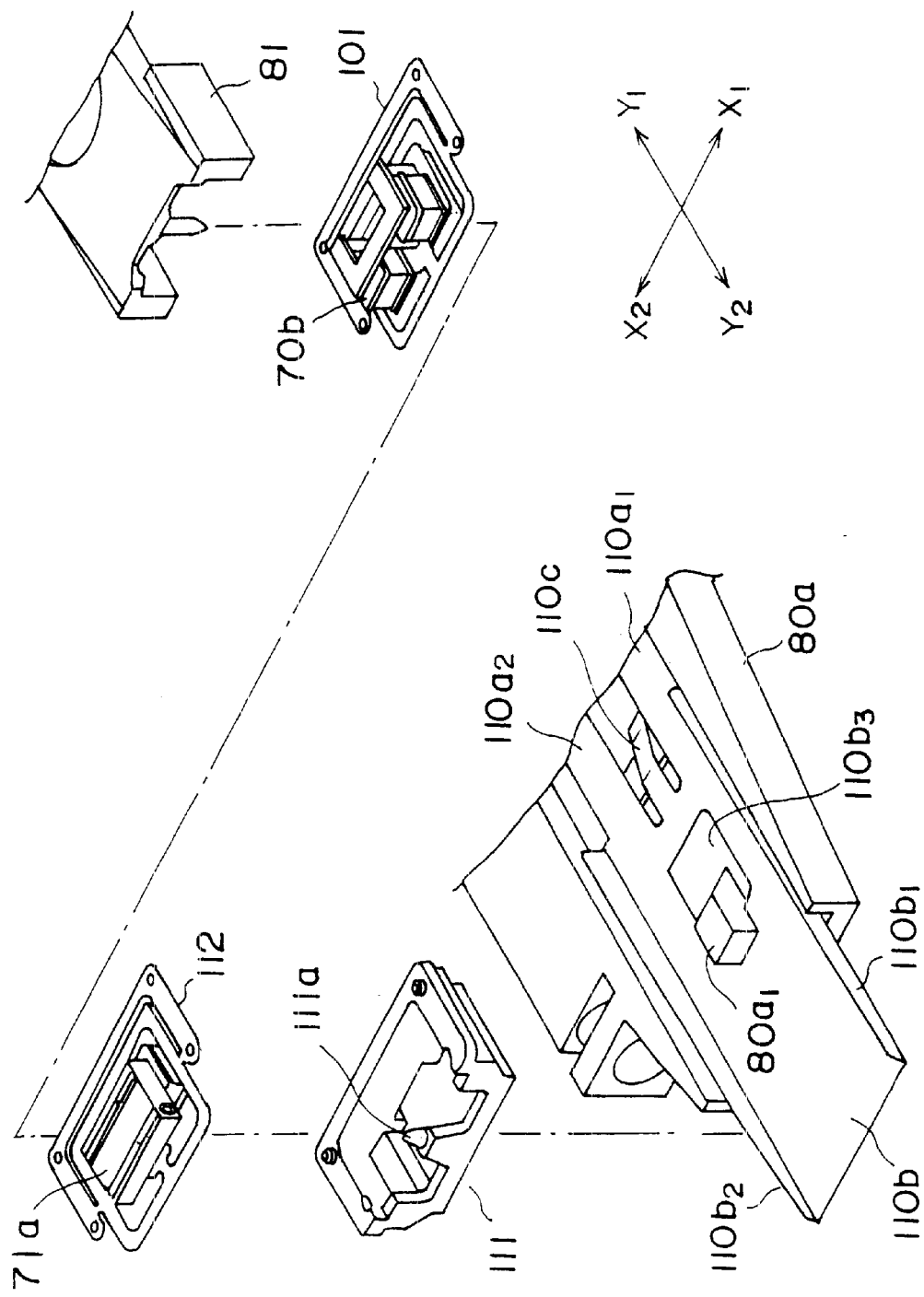
FIG. 8 is an expanded and exploded view of a lower magnetic head and upper magnetic head portion of a front edge of a head carriage.
Figure 9:
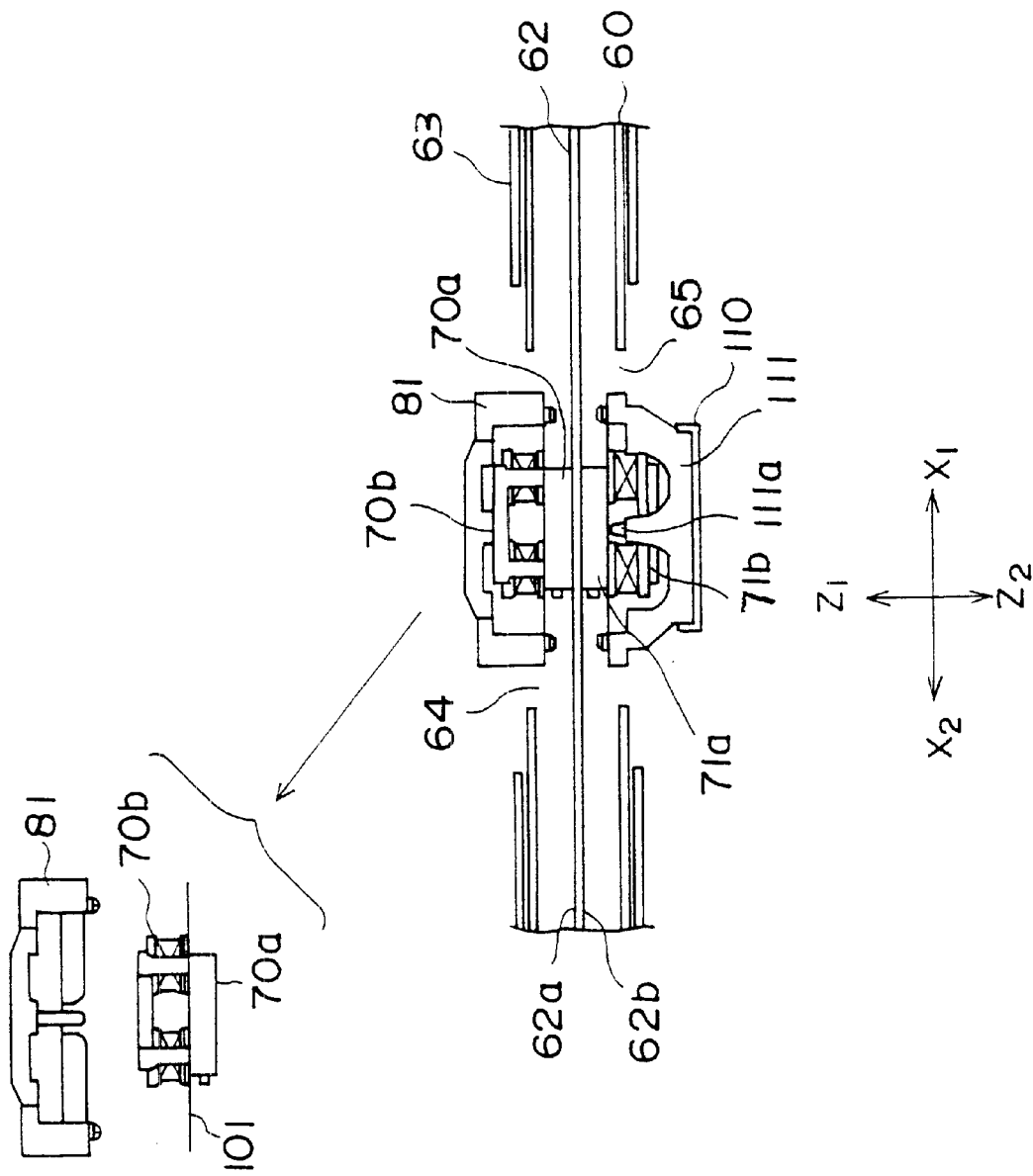
FIG. 9 is a diagram showing the lower magnetic head and upper magnetic head in a state of contact with a floppy disk.
Figure 10:
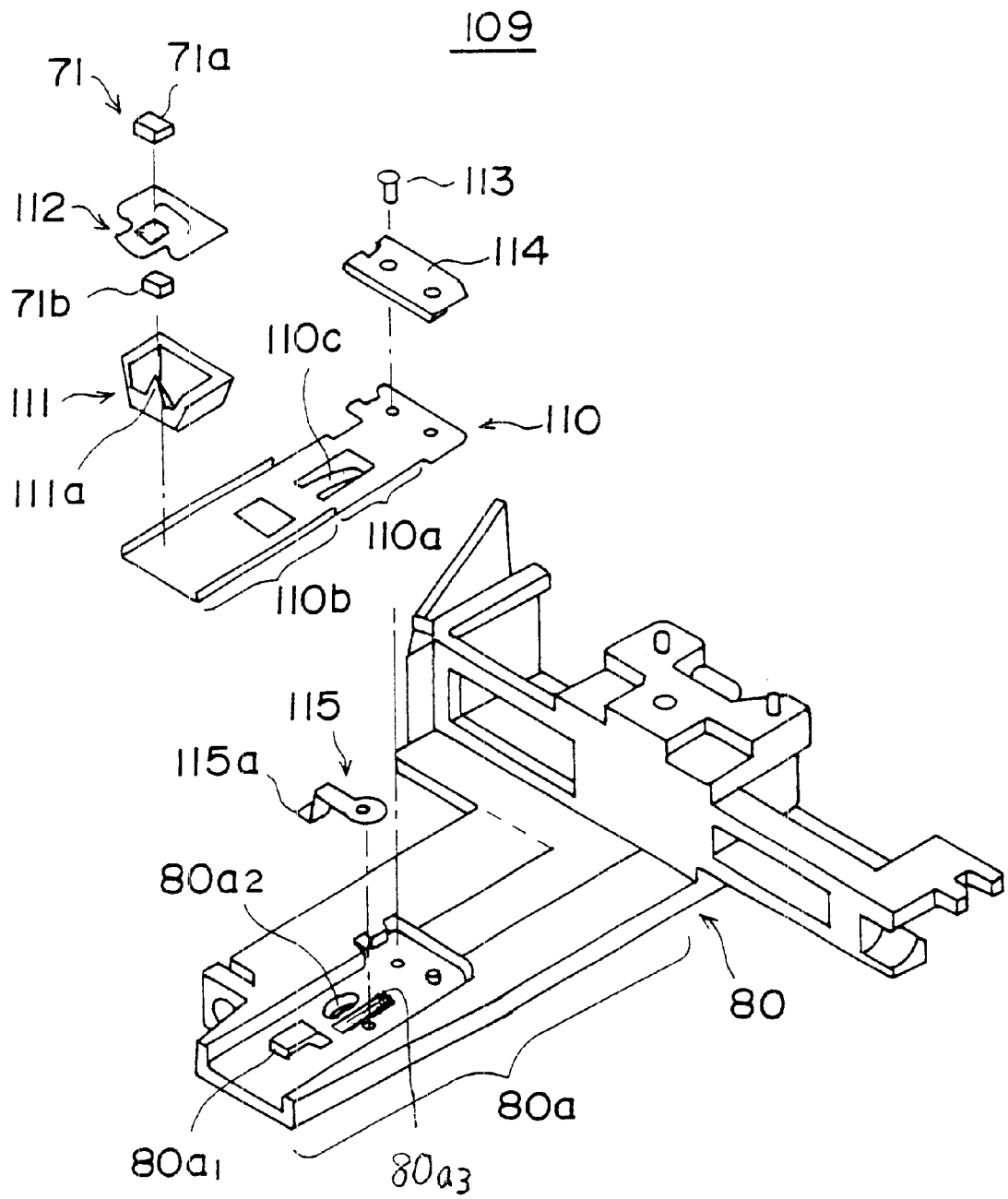
FIG. 10 is an exploded view of a lower magnetic head load pressure adjustment mechanism according to the present invention.

As shown in FIG. 7 through FIG. 9, the upper magnetic head 70 has a slider portion 70a including an electromagnetic core portion (not shown) and a coil portion 70b. The slider portion 70a is fixedly mounted on a lower surface of the gimbal 101 and the coil portion 70b is fixedly mounted on an upper surface of the gimbal 101.

A flat flexible relay cable 103 is mounted on the upper surface of the upper head arm 81. This flat flexible relay cable 103 has a shape that corresponds to the shape of the upper head arm 81 and has a 7-wire pattern (not shown) extending in the Y1-Y2 direction, and is further provided with terminals 103a and 103b at both ends of the wiring pattern (not shown). Terminal 103a is exposed at a window 81a of the upper head arm 81 and terminal 103b is exposed at a window 81b of the upper head arm 81. As shown in FIG. 6, a lead edge of a lead wire 104 extending from the upper magnetic head 70 is connected to terminal 103. Lead wire 105, one end of which is connected to terminal 103b, is pressed into a guide groove 81c formed on a portion of the upper surface of the upper head arm 81 near a base thereof so as to follow this guide groove 81c.

A detailed description will now be given of a lower magnetic head load pressure adjustment mechanism 109 included in the head carriage 54, with reference to FIG. 8 through FIG. 13.

A lower suspension spring plate 110 is fixedly mounted at a rear Y1 edge to an arm portion 80a extending forward from the carriage body 80 in the Y2 direction by a plate 114, the plate 114 being affixed to the arm section 80a of the carriage body 80 with a screw 114a. The lower suspension spring plate 110 further comprises a spring plate portion 110a at the rear Y1 edge affixed to the arm 80a by the plate 114 and a rigid arm portion 110b at the front Y2 edge. The lower magnetic head 71 is mounted on the rigid arm portion 110b.

The spring plate portion 110a comprises two substantially parallel long narrow strips 110a1 and 110a2 on both the X1 and X2 sides of the spring plate portion 110a. The two substantially parallel long narrow strips 110a1 and 110a2 are slanted upward in the Z1 direction the further they progress forward in the Y2 direction and thus functions as a spring. The rigid arm portion 110b is pushed upward by the spring force of these two substantially parallel long narrow strips 110a1 and 110a2, thereby imparting head load pressure to the lower magnetic head 71. The rigid arm portion 110b has two rib portions 110b1 and 110b2 bent at both sides, which rib portions 110b1 and 110b2 supply rigidity.

As described above, the lower magnetic head 71 is mounted on the forward Y2 edge of the rigid arm portion 110b. The rigid arm portion 110b has an opening 110b3 formed at substantially a middle portion thereof and a tongue-shaped head load spring portion 110c formed at a rear Y1 edge. This tongue-shaped head load spring portion 110c is located between the two substantially parallel long narrow strips 110a1 and 110a2 and extends from the rigid arm portion 110b in the rear Y1 direction. This tongue-shaped head load spring portion 110c is slanted downward in the Z2 direction and thus functions as a spring.

The above-mentioned opening 110b3 fits into an L-shaped stopper 80a1 formed on an upper surface of the arm 80a. As will be explained later, the head load pressure of the lower magnetic head 71 is adjusted by the spring force of this head load spring portion 110c. The rigid arm portion 110b is movably positioned between a lower surface of the stopper 80a1 and the upper surface of the arm 80a so as to be movable vertically, that is, in the Z1-Z2 direction. The lower magnetic head 71 is similarly movable in the vertical Z1-Z2 direction for approximately 0.2 mm.

As shown in FIG. 8, a lower block 111 is fixedly mounted on the rigid arm portion 110b. The lower magnetic head 71 is supported by a gimbal 112, the gimbal 112 being fixedly mounted on the lower block 111. As shown in FIG. 8 and FIG. 9, the lower magnetic head 71 has a slider portion 71a including an electromagnetic core portion (not shown) and a coil portion 71b. The slider portion 71a is fixedly mounted on an upper surface of the gimbal 112 and the coil portion 71b is fixedly mounted on a lower surface of the gimbal 112. A convex projecting portion 111a of the lower block 111 presses on a central portion of the gimbal 112. Additionally, one end of a long narrow strip of flexible cable 113 is affixed to the rigid arm portion 110b. A lead wire extending from the lower magnetic head 71 is connected to the flexible cable 113. This flexible cable 113 extends laterally toward the X2 side.

As shown in FIG. 11(B), a concave receding portion 80a3 is formed on the upper surface of the arm 80a of the carriage body 80. The head load spring portion 110c fits into this concave portion 80a.

As shown in FIG 11(A), a head load pressure adjustment lever 115 is rotatably positioned on the upper surface of the arm 80a of the carriage body 80 near the above-mentioned concave portion 80a3 so as to rotate through a horizontal plane. The head load pressure adjustment lever 115 is substantially crank-like in shape, with a tip portion bent so as to form an operating handle 115a, the operating handle 115a being exposed at a back surface of the arm 80a through an opening 80a 2 in the arm 80a of the carriage body 80 as shown in FIG. 11(C). Thus, the operating handle 115a can be operated from the back of the floppy disk apparatus 50.

Figure 11:
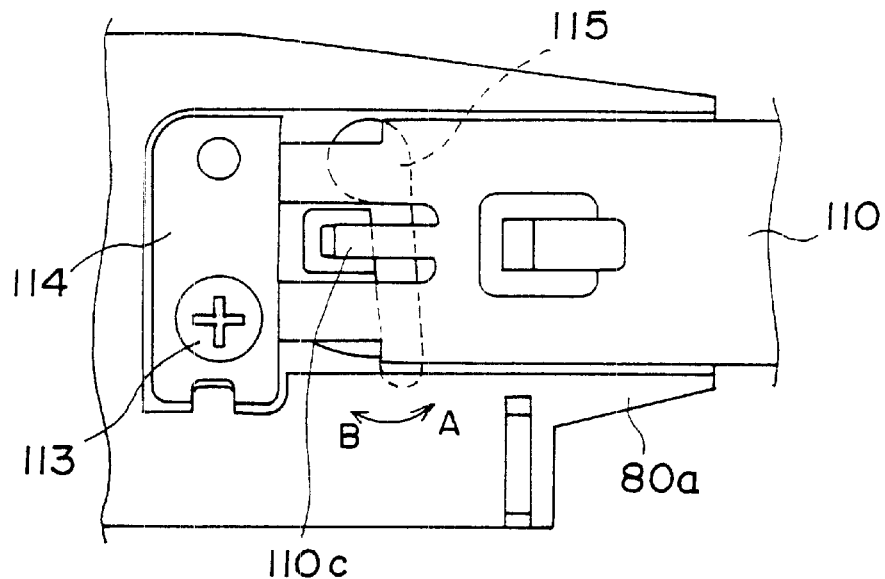
FIGS. 11(A), 11(B) and 11(C) are respectively diagrams showing the lower magnetic head in a state of being maximally adjusted.
Figure 11:
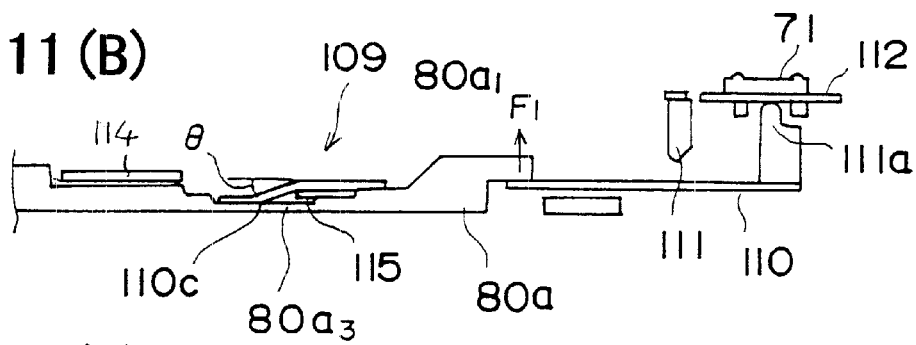
Figure 11:
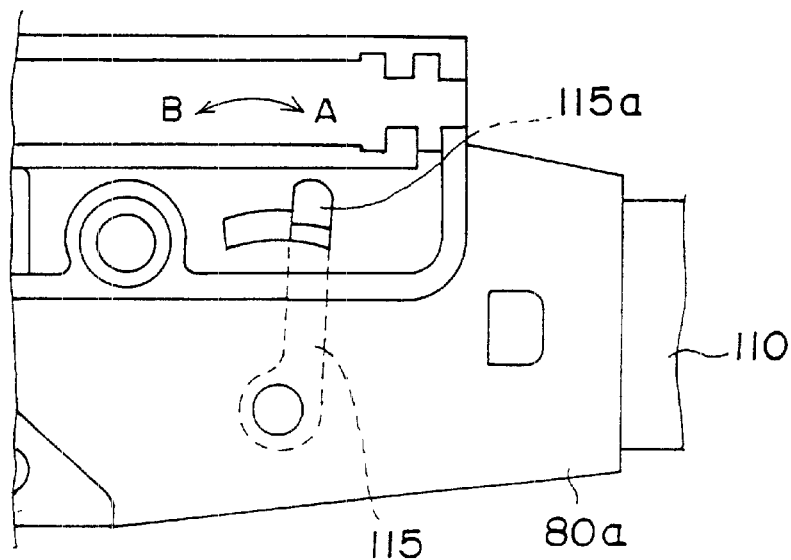

A detailed description will now be given of adjustment of the lower magnetic head load pressure of the present embodiment, with reference to FIG. 11 through FIG. 13.

FIG. 11(A), FIG. 11(B), FIG. 11(C) and FIG. 13(A) show a state of maximum adjustment Pmax of the lower magnetic head load pressure. FIG. 12(A), FIG. 12(B), FIG. 12(C) and FIG. 13(B) show a state of minimum adjustment Pmin of the lower magnetic head load pressure. Normally, the operating handle 115a is set to a position between the position shown in FIG. 11(C) and the position shown in FIG. 12(C).

As shown in FIG. 11(A) through FIG. 11(C), when the lever 115 is in a state of being rotated in the A direction the lever 115 contacts a base portion of the head load spring portion 110c, the head load spring portion 110c is accommodated within the concave portion 80a3 without any deflection and thus no spring force is generated at the head load spring portion 110c. In this condition, the rigid arm portion 110b presses against the L-shaped stopper 80a1 with a force F1 generated by a spring force provided by the two substantially parallel long narrow strips 110a1 and 110a2 on both the X1 and X2 sides of the spring plate portion 110a.

A disk cartridge 60 is loaded into the floppy disk apparatus 50 so that the lower surface 62b of the floppy disk 62 is positioned below the upper surface of the lower magnetic head 71. Accordingly, when the disk cartridge 60 is loaded, the lower magnetic head 71 pushes the point of contact with the floppy disk upward in the vertical Z1 direction because the rigidity of the floppy disk 62 is small compared to the force F1, and thus the floppy disk is bent in an upwardly convex manner, that is, the penetration margin is in a positive state.

When the floppy disk 62 inserted in the floppy disk apparatus 50 starts to rotate at high speeds of for example 3,600 rpm, the rigidity of the floppy disk 62 increases and becomes greater than the force F1, thus causing the floppy disk 62 to return to a state in which the lower surface of the floppy disk 62 is substantially flat, thus pushing the lower magnetic head 71 downward in the direction Z2, that is, the penetration margin is in a zero state.

Figure 13A:
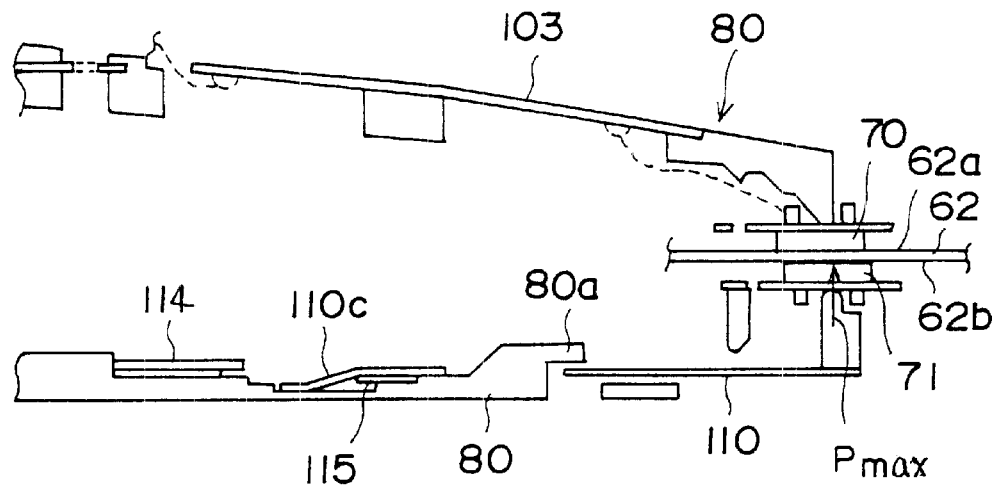
FIGS. 13(A) and 13(B) show the lower magnetic head in a state of being minimally as well as maximally adjusted.

Under the conditions described above, the upper magnetic head 70 contacts the upper surface 62a of the floppy disk 62. That is, as shown in FIG. 13(A), the lower surface 62b of the floppy disk 62 pushes down on the lower magnetic head 71 in the Z2 direction, causing the two substantially parallel long narrow strips 110a1 and 110a2 to elastically deflect and thus move the rigid arm portion 110b away from the stopper 80a1 in the Z2 direction. As a result, the spring force of the two substantially parallel long narrow strips 110a1 and 110a2 presses the lower magnetic head 71 against the lower surface 62b of the floppy disk 62 with a maximum head load pressure Pmax.

Figure 12:
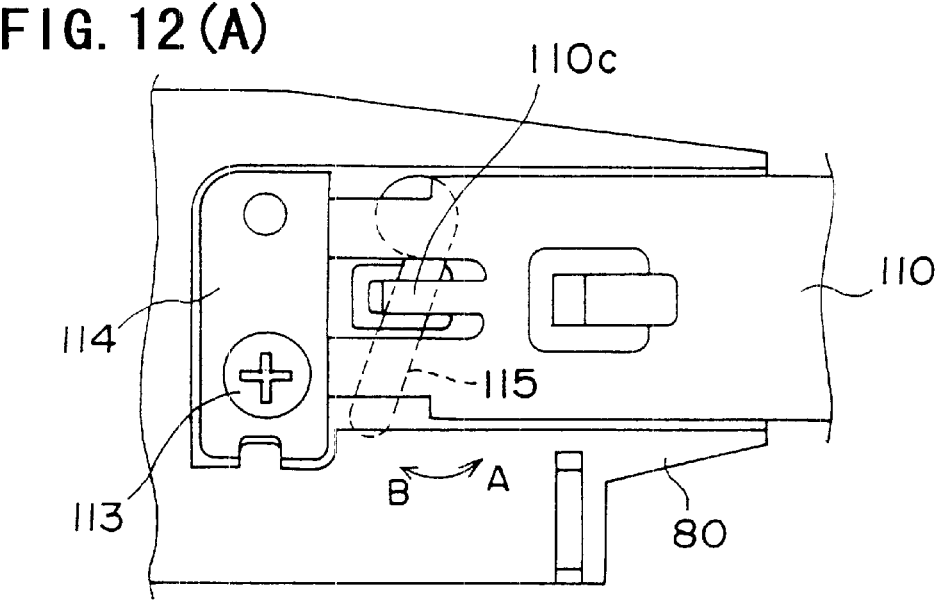
FIGS. 12(A), 12(B) and 12(C) are respectively diagrams showing the lower magnetic head in a state of being minimally adjusted.
Figure 12:
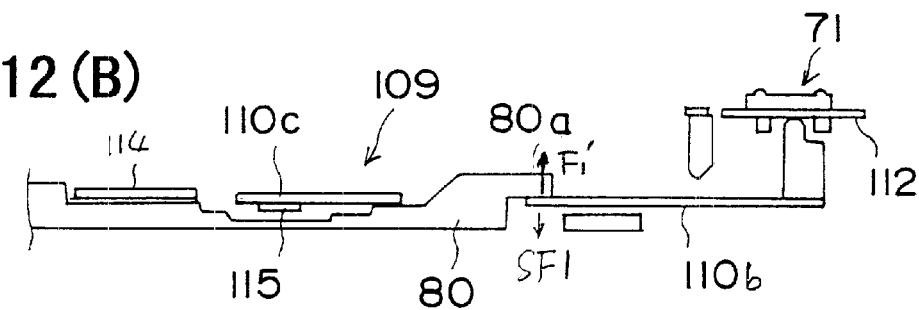
Figure 12:
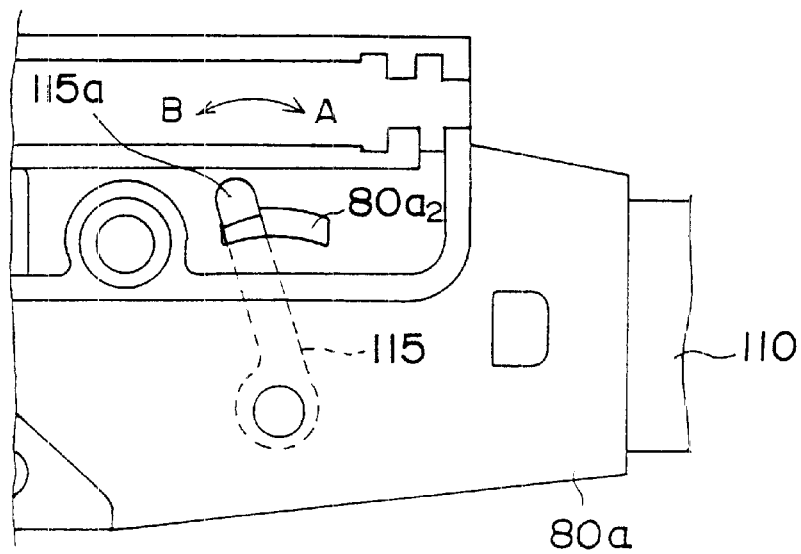
Figure 13B:
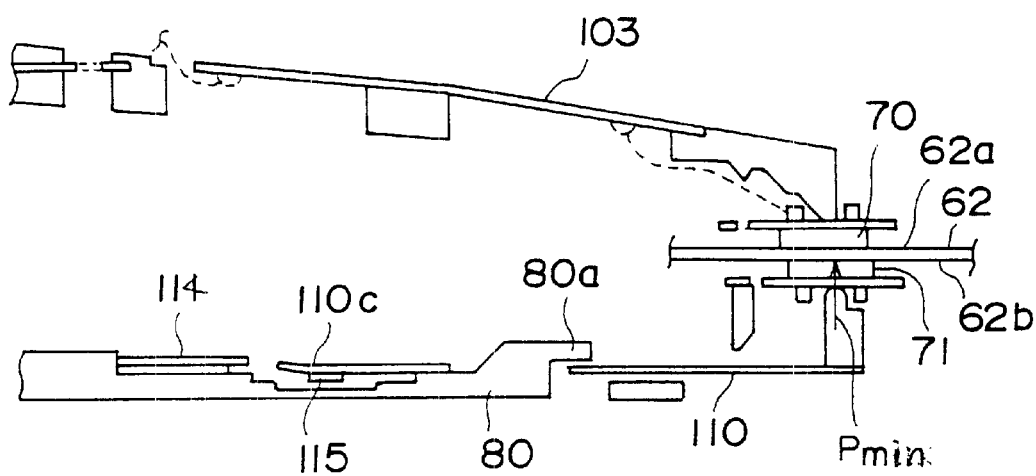
Figure 14:
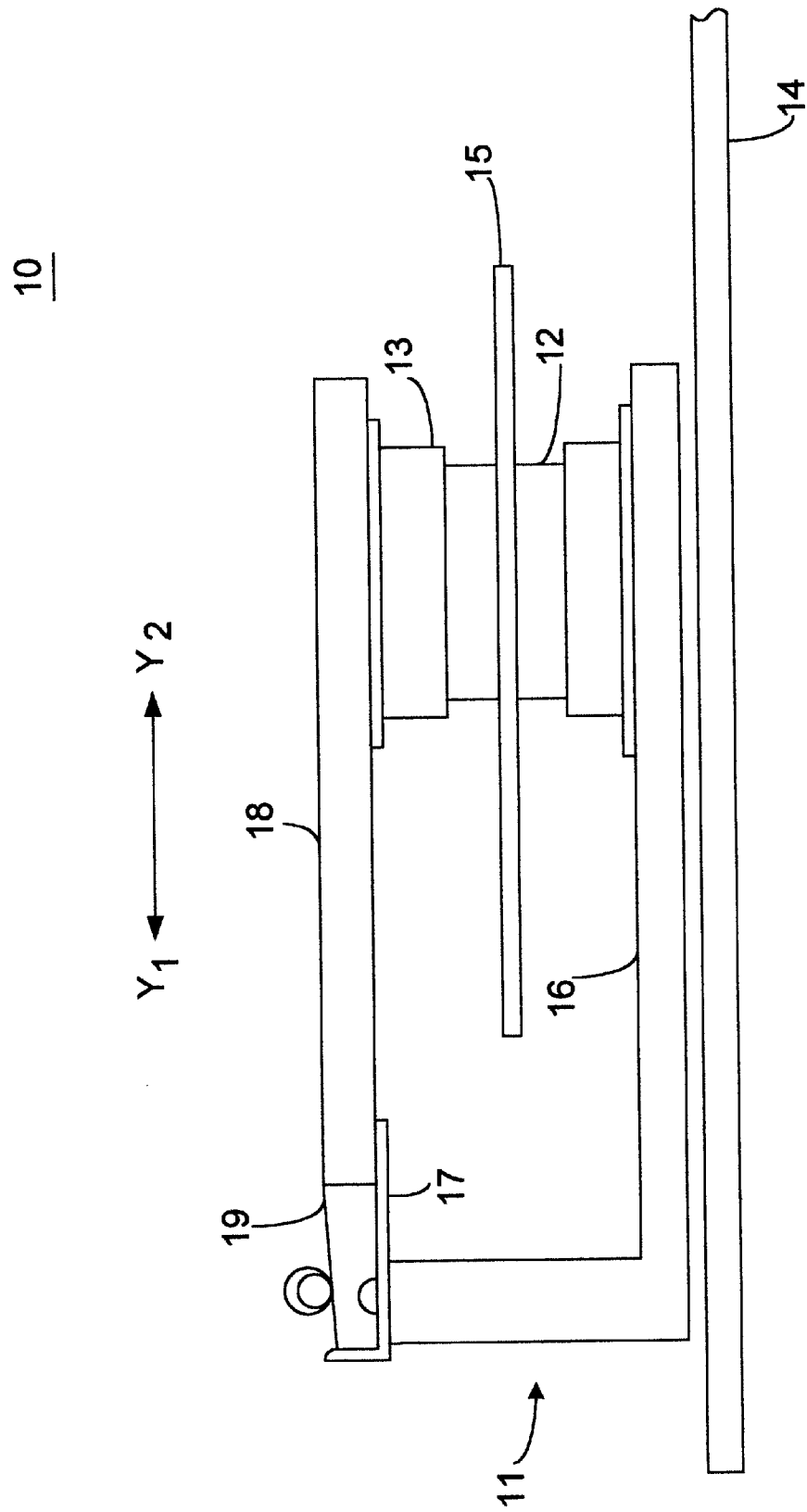
FIGS. 14 is a diagram showing an example of the conventional art.

Operating the operating handle 115a from the rear of the floppy disk apparatus 50 so as to rotate the lever 115 in the B direction elastically deflects the head load spring portion 110c as shown in FIG. 12 and FIG. 13, generating a spring force which causes the rigid arm portion 110b to generate a force SF1 in the Z2 direction, as shown in FIG. 12(B). Thus, the force F1 exerted by the rigid arm portion 110b against the stopper 80a1 decreases by the spring force SF1 to a lesser force F1'. Accordingly, maximally rotating the lever 115 in the B direction maximizes the spring force SF1 and minimizes the force F1', and thus the head load pressure of the lower magnetic head 71 becomes a minimum value Pmin as shown in FIG. 12 and FIG. 13(B).

The size of the head load spring portion 110c is small in comparison to the two substantially parallel long narrow strips 110a1 and 110a2, and the spring force generated by the head load spring portion 110c being deflected is also small in comparison to the spring force generated by the two substantially parallel long narrow strips 110a1 and 110a2 being deflected. That is, the spring force of the head load spring portion 110c only changes the head load pressure of the lower magnetic head 71 in small increments. As a result, the head load pressure of the lower magnetic head 71 can be precisely adjusted.

It should be noted that an angle of inclination θ of the head load spring portion 110c in the vertical Z1-Z2 direction with respect to a horizontal plane is only approximately 20° and a slant of the head load spring portion 110c is thus gentle. As a result, rotating the lever 115 to stop positions determined with ordinary care results in changes in small increments to the state of the deflection of the head load spring portion 110c, and thus precisely adjusts the head load pressure of the lower magnetic head 71.

Accordingly, the head load pressure of the lower magnetic head 71 can be set to a uniform optimum state by adjusting the head load pressure adjustment lever 115 while monitoring the data writing and reading condition of the floppy disk apparatus 50. As a result, it becomes possible to obtain optimum positioning of the lower magnetic head with respect to the floppy disk, thus obtaining reliable data writing and data reading for all floppy disk apparatuses 10.

Additionally, the amount of vertical movement of the lower suspension 110 can change is restricted by the lower surface of the stopper 80a1 and the upper surface of the arm 80a, so excessive deformation is prevented. As a result, plastic deformation due to excessive deformation caused by external shock or vibration can be prevented.

Further, the head load pressure adjustment lever 115 is rotatable mounted on the carriage body in such a way as to rotate through a horizontal plane. As a result, the lower magnetic head load pressure adjustment mechanism is not bulky and the floppy disk apparatus 10 can therefore be made slim.

The embodiment of the floppy disk apparatus 50 described above has a high-density mode for use with high-density floppy disks and a normal mode for use with conventional 1.44 MB floppy disks. In the normal mode, the head load pressure of the lower magnetic head 71 is adjusted so that the penetration margin is positive, that is, the rotation speed and thus the rigidity of the floppy disk 62 is low and so the lower magnetic head 71 pushes upward in the direction of the upper magnetic head 70, thus bending the floppy disk 62 so that it projects in an upwardly convex direction. By contrast, in the high-density mode, as described above, the head load pressure is adjusted so that the penetration margin is approximately zero.

It should be noted that in the embodiment described above the state of the deflection of the head load spring portion 110c is adjusted by the head load pressure adjustment lever 115 in such a way that the lower magnetic head load pressure decreases when the bend of the head load spring portion 110c increases. However, the present embodiment may also be structured so that the lower magnetic head load pressure is set at a minimal pressure during a state in which the head load spring portion 110c is not yet bent, the lower magnetic head load pressure increasing as the bend of the head load spring portion 110c increases.

The above description is provided to enable any person skilled in the art to make and use the invention and sets forth the best mode contemplated by the inventors of carrying out their invention. In addition, the present invention is not limited to the specifically disclosed embodiments and variations, and modifications may be made without departing from the scope of the present invention.

The present application is based on Japanese priority application No. 10-61611 filed on Mar. 12, 1998, the entire contents of which are hereby incorporated by reference.

What is claimed is:

1. A disk apparatus comprising:
   a disk rotating unit supporting and rotating a disk;
   a magnetic head reading data from and writing data to a surface of the disk; and
   a head carriage supporting the magnetic head and moving the magnetic head in a radial direction of the disk,
   the head carriage further comprising:
      a carriage body;
      a suspension having a base part fixed to the carriage body, the magnetic head being fixed to an end of the suspension so that the magnetic head is supported in a cantilever fashion, the suspension producing a head load pressure at which the magnetic head pushes the surface of the disk; and
      an adjustment member rotatably attached to the carriage body and arranged so that when the adjustment member makes contact with the suspension, a force is applied to the suspension based on the direction of rotation of the adjustment member to counteract or supplement the suspension force producing the head load pressure so that the head load pressure can be adjusted in collaboration with the suspension and the position of the adjustment member.

2. The disk apparatus as claimed in claim 1, said adjustment member comprising:
   a contacting portion that contacts said suspension; and
   an operating portion for moving said adjustment member.

3. The disk apparatus as claimed in claim 2, wherein said operating portion of the adjustment member is provided to a surface of the carriage body opposite another surface thereof facing the disk.

4. The disk apparatus as claimed in claim 1, wherein the suspension comprises a head load spring which is a part of the suspension and is bent so that the head load pressure can be changed, the adjustment member changing a state of bending of the head load spring.

5. The disk apparatus as claimed in claim 1, wherein the adjustment member changes the head load pressure by changing a contact position in which the adjustment member is in contact with the suspension.

6. The disk apparatus as claimed in claim 1, further comprising a restraining member attached to the carriage body, the restraining member preventing the suspension from being deformed towards the disk beyond a predetermined point.

7. The disk apparatus according to claim 1 wherein said suspension is provided with a head load spring portion elastically deflecting to adjust the head load pressure exerted on the surface of the disk, the suspension and the adjustment member being arranged so that when said adjustment member moves into contact with said suspension said adjustment member increases the quantity of the elastic deflection of the head load spring portion, thereby decreasing the head load pressure.

8. A disk apparatus comprising:
   a disk rotating unit supporting and rotating a disk;
   a magnetic head reading data from and writing data to a surface of the disk; and
   a head carriage supporting the magnetic head and moving the magnetic head in a radial direction of the disk, the head carriage further comprising:
      a carriage body;
      a suspension having a base part fixed to the carriage body, the magnetic head being fixed to an end of the suspension so that the magnetic head is supported in a cantilever fashion, the suspension producing a head load pressure at which the magnetic head pushes the surface of the disk; and
      an adjustment member movable on a surface of said carriage body relative to said suspension, said adjustment member adjusting the head load pressure of the magnetic head as exerted on the surface of the disk when the head reads data from the disk or writes data to the disk such that when said adjustment member moves into contact with said suspension said adjustment member increases or decreases the head load pressure based upon the degree of contact between said adjustment member and said suspension.

9. A disk apparatus comprising:
   a disk rotating unit supporting and rotating a disk;
   a magnetic head writing data to and reading data from a surface of the disk;
   a head carriage moving the magnetic head in a radial direction of the disk and having a carriage body, the carriage body supporting the magnetic head at an end of the carriage body;
   a suspension causing the magnetic head to exert a lead load pressure on the surface of the disk, the suspersion having a portion on which the magnetic head is mounted and a base fixed to the carriage body;
   a head load spring portion provided on a portion of the suspension and elastically deflecting to adjust the head load pressure of the magnetic head on the surface of the disk; and
   an adjustment member movable on a surface of said carriage body relative to said suspension, said adjustment member adjusting the head load pressure of the magnetic head which is exerted on the surface of the disk when the head reads data from the disk or writes data to the disk,
   wherein the suspension and the adjustment member are arranged so that when said adjustment member moves into contact with said suspension said adjustment member increases the quantity of the elastic deflection of the head load spring portion, thereby decreasing the head load pressure.

* * * * *